United States Patent [19]

Williams

[11] Patent Number: 4,624,348

[45] Date of Patent: Nov. 25, 1986

[54] ROLLER RETAINER FOR BRAKE ASSEMBLY

[75] Inventor: William J. Williams, Lake Orion, Mich.

[73] Assignee: Rockwell International Corporation, Pittsburgh, Pa.

[21] Appl. No.: 306,574

[22] Filed: Sep. 28, 1981

Related U.S. Application Data

[63] Continuation of Ser. No. 108,447, Dec. 31, 1979, abandoned.

[51] Int. Cl.$^4$ ............................................. F16D 51/22
[52] U.S. Cl. ................................. 188/330; 188/250 C; 188/250 F; 188/332; 267/164
[58] Field of Search ............... 188/324, 329, 330, 332, 188/338, 339, 341, 343, 250 F, 250 C; 267/164, 165, 182; 192/78; 24/261 R; 74/569

[56] References Cited

U.S. PATENT DOCUMENTS

| | | | |
|---|---|---|---|
| 113,289 | 4/1871 | Goss | 24/261 R |
| 140,300 | 6/1873 | Ogden | 24/261 R X |
| 323,262 | 7/1885 | Blinzler | 24/261 R X |
| 351,529 | 11/1886 | Schaeffer | 24/261 R |
| 381,608 | 4/1888 | Beisonhert | 24/261 R X |
| 2,496,811 | 2/1950 | Newton | 24/261 R X |
| 2,613,416 | 10/1952 | Raynor, Jr. | 24/73 C |
| 2,781,868 | 2/1957 | House | 188/330 |
| 3,469,660 | 9/1969 | Mathers | 188/330 |
| 3,675,275 | 7/1972 | Arblaster | 24/261 R X |
| 3,849,838 | 11/1974 | Hehl | 24/73 C |

FOREIGN PATENT DOCUMENTS

| 1564873 | 3/1969 | France | 188/329 |
|---|---|---|---|
| 100919 | 8/1923 | Switzerland | 24/261 R |

Primary Examiner—George E. A. Halvosa

[57] ABSTRACT

A roller retainer for a cam actuated vehicle brake assembly comprising a member preferably formed from spring wire to provide two substantially parallel legs with a tang at the end of each leg and a manual grip intermediate the legs. The tangs are seated in apertures provided to a dual web brake shoe and a portion of the member intermediate the manual grip and the tanged ends extends only partially around the roller so the manual grip and the tanged ends are disposed on the same side of a reference plane parallel to the legs and passing through the axis of the roller. This enalbes the retainer to be rotated about the apertures thereby allowing the roller to be safely removed from the brake shoe while the shoe remains in the assembly without the use of any tools.

6 Claims, 7 Drawing Figures

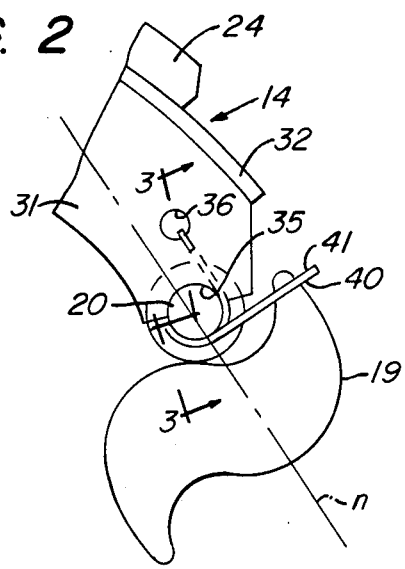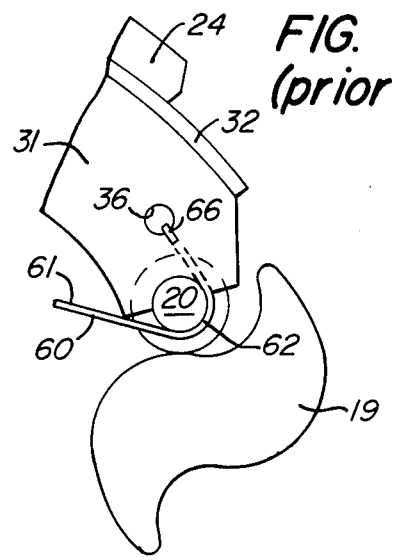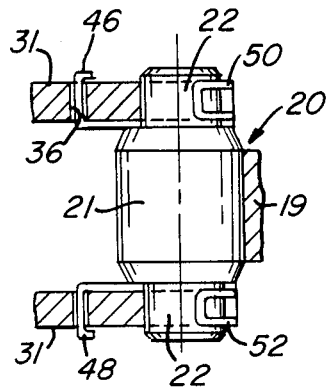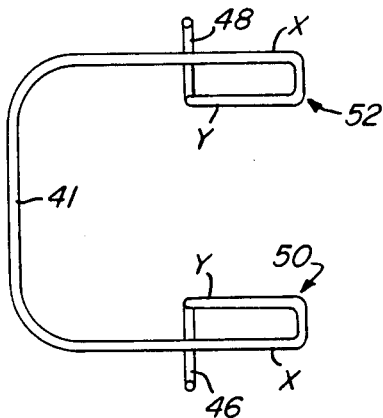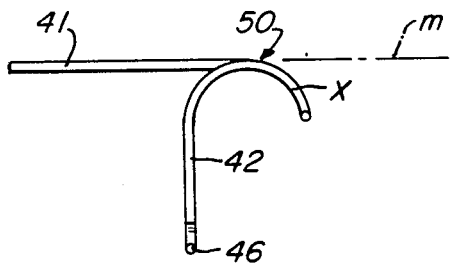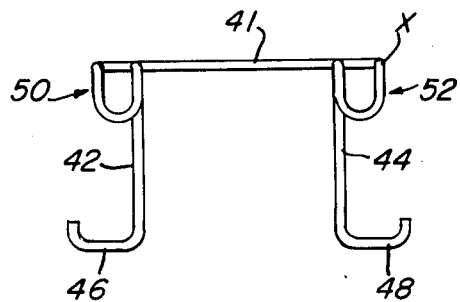

ROLLER RETAINER FOR BRAKE ASSEMBLY

This is a continuation of application Ser No. 108,447, filed Dec. 31, 1979, now abandoned.

BACKGROUND OF THE INVENTION

1. Field of the Invention

The present invention is directed to an improvement in a vehicle brake mechanism and more specifically to a roller retainer for a cam actuated brake assembly.

The invention is particularly useful in a brake assembly of the type disclosed in U.S. Pat. No. 4,206,834. That brake assembly includes a pair of brake shoes having adjacent ends pivotally mounted to a support and a rotatable actuating cam disposed between the other ends of the brake shoes. A roller-type cam follower is provided between each of those other ends of the brake shoes and the actuating cam. The roller-type cam followers are seated in open-ended recesses provided to the brake shoes. Rotary movement of the actuating cam is applied to the roller-type cam followers which cause their respective brake shoes to pivot outwardly about their pivot or anchor pins to contact the inwardly facing friction surface of a brake drum.

The roller-type cam followers are comprised of a stepped cylindrical steel pin having a center portion which bears against the actuating cam and smaller diameter end portions which serve as tunnions seated in the open ended recess provided to the spaced webs of a dual web brake shoe. Under normal conditions, the roller-type cam follower is trapped between the open ended recesses provided to the dual web brake shoe and the bearing surface of the actuating cam and held in that arrangement by the brake return spring. However, the brake assembly is comprised of a number of different parts and it is also advantageous to maintain the cam followers in the recesses provided to the brake shoes during assembly and disassembly of the brake mechanism for repair purposes. This limits the number of parts the mechanic has to be concerned with at any given time and the attendant possibility of dropping and losing the relatively small cam-follower rollers.

It has also become known that means for retaining a roller between the actuating cam and the open recesses provided to the ends of the brake shoe is also beneficial under conditions where the brake assembly is not maintained in adjustment particularly during extremely cold weather. Under such conditions, rollers have become displaced from their position in the open-ended recesses of the brake shoe webs which of course adversely affects operation of the brake assembly.

It is also desirable for assembly and maintenance purposes if the roller retaining means allow the cam-follower rollers to be applied and removed without the use of any tools.

2. Description of the Prior Art

U.S. Pat. No. 3,114,437 discloses one method of retaining a roller-type cam follower in open-ended recesses provided to brake shoes. In that patent the mouth of the open-ended recesses is formed to retain the ends of the rollers and a tool such as a screw driver may be required to remove the rollers from the brake shoes.

A spring has also been employed to retain a roller in its brake during transfer and assembly. The prior art spring retained the roller satisfactorily but the roller could not be withdrawn from the brake assembly without risk of injury to the mechanic's hand. The distance required for the retainer spring to clear other components of the brake assembly is such that a screwdriver or other tool was often used as a pry bar to expand the return spring.

SUMMARY OF THE INVENTION

The present invention is a roller retainer for a vehicle brake assembly comprising a member formed to provide two substantially parallel legs with a tang formed at the end of each leg, a manual grip formed in the member intermediate the legs and at least one portion of the member intermediate the tangs and the grip formed to extend in one direction circumferentially around part of a roller with the legs of the member extending tangentially away from the roller in the other circumferential direction. The roller retainer is preferably formed from a length of spring wire and is used in combination with a brake shoe having a dual web structure in which the webs are formed with similar and laterally aligned open end recesses and an aperture adjacent each recess. The tangs formed at the ends of each leg of the retainer are seated in one of the apertures and a portion of each leg intermediate the manual grip and the tang extends partially around one of the roller trunnions and returns around that same portion of the roller trunnion so the manual grip and the tangs are disposed on the same side of a reference plane parallel to the legs and passing through the axis of the roller. This arrangement enables the retainer to be rotated about the apertures thereby allowing the roller to be safely removed from the brake shoe while the shoe remains in the assembly without the use of any tools.

The invention and the advantages offered thereby will become apparent from the following detailed description of the embodiment shown by the accompanying drawings.

BRIEF DESCRIPTION OF THE DRAWINGS

In the drawings wherein like reference numerals refer to like parts:

FIG. 2 is an enlarged view of a portion of FIG. 1 showing the roller retainer of the present invention;

FIG. 3 is a section on line 3—3 of FIG. 2;

FIG. 4 is a view similar to FIG. 2 but showing a prior art roller retainer;

FIG. 5 is a plan view of the roller retainer of the present invention;

FIG. 6 is a side elevation of the roller retainer of the present invention; and

FIG. 7 is a end elevation of the roller retainer of the present invention.

DESCRIPTION OF THE INVENTION

Figure 1:
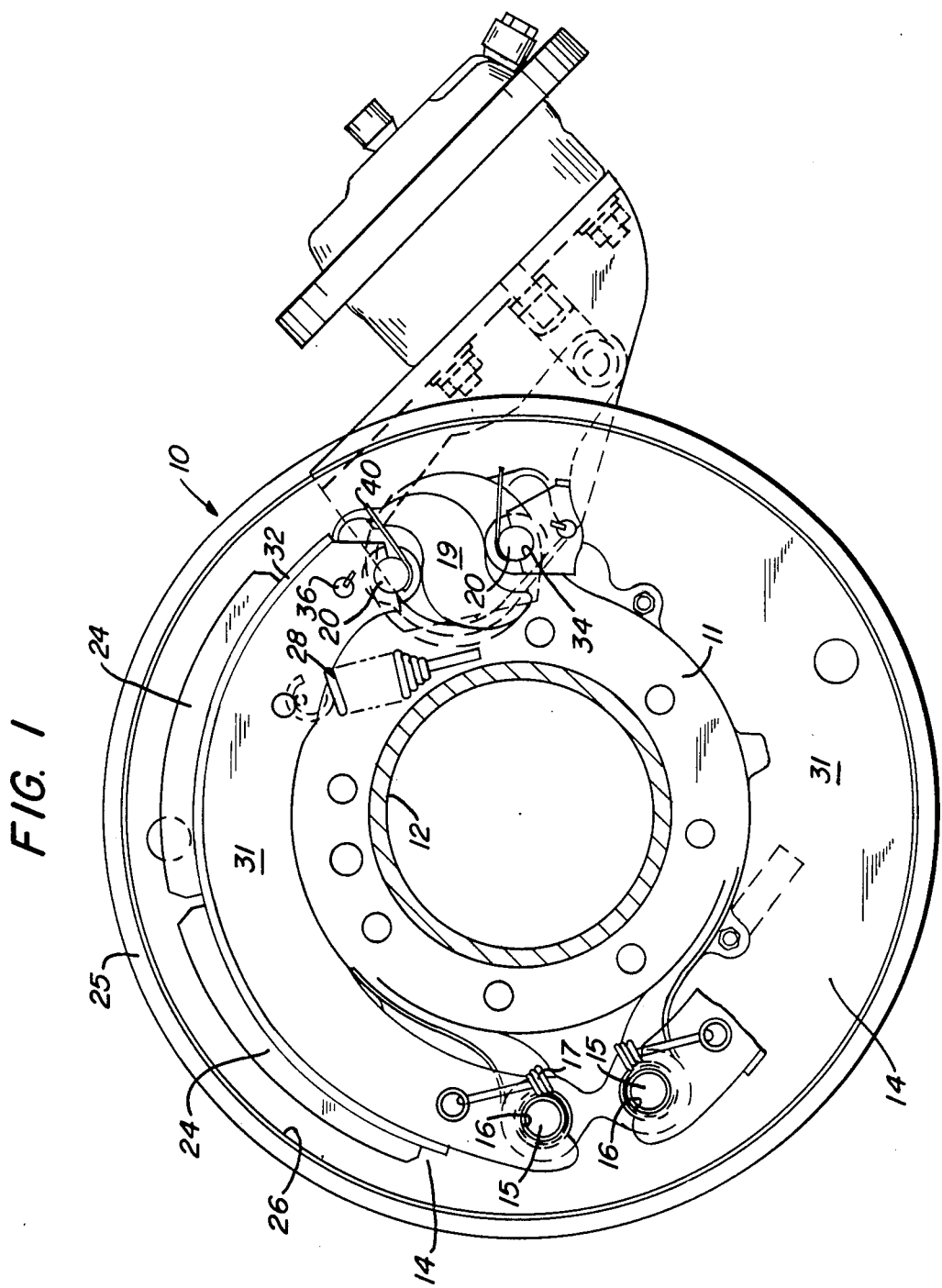
FIG. 1 is a side elevation, partly in section, of a brake assembly according to the present invention.

With reference to the drawings there is shown a cam actuated brake assembly generally designated by the numeral 10. The brake assembly 10 is supported by a spider 11 rigid with a vehicle axle housing 12. The brake assembly 10 includes a pair of brake shoes 14 each of which is pivotally mounted by a recess 16 at one end to an anchor pin 15 carried by the spider 11. A cam 19 is mounted for rotary movement between the adjacent ends of the brake shoes 14 opposite from the anchor pins 15. The brake shoes 14 are each provided with a roller type cam follower 20. The cam is nonrotatably secured to a cam shaft mounted to the spider for rotary movement by conventional means to rock the cam 19 in a clockwise direction through an arc in the range of about 10° to 30°0 degrees. The cam 19 provides an outwardly directed force to the rollers 20 and the brake shoes 14 which cause the brake shoes to pivot about the anchor pins 15. This movement forces friction lining pads 24 carried by the brake shoes 14 into contact with the inwardly facing friction surface 26 of a brake drum 25 secured by conventional means to a wheel rotatably mounted to a spindle at the outer end of axle housing 12. When the brakes are released the brake shoes 14 and the friction lining pads 24 are withdrawn from contact with the brake drum surface 26 by a return spring 28 secured at its opposite ends to the brake shoe webs.

The brake shoes 14 are dual web fabricated brake shoes. That is, each brake shoe includes a pair of axially spaced webs 31 secured to a table 32. The webs 31 are flat in a radial direction and curved in a longitudinal or circumferential direction. The brake shoe table 32 is curved in the circumferential direction and the webs 31 are welded in parallel relation along the interior curved portion of the table. This provides a generally rigid assembly of component parts to which the friction lining pads 24 may be secured by rivets or by chemical bonding.

Each of the brake shoe webs 31 is provided with an open recess 34 opposite the cam follower 120 and an aperture 36 adjacent thereto. The recess 34 is in the form of a slot which includes an inner arcuate bearing surface or journal 35 and a mouth formed by integral brake shoe portions. The recesses are identical and laterally aligned. The bearing surfaces 35 are semi-circular bearing surfaces and are adapted to engage a complementary arcuate surface of the generally cylindrical end portion 22 of the cam follower roller. As best shown by FIGS. 2 and 3 each cam roller follower 22 is comprised of a cylindrical roller surface 21 located intermediate the brake shoe webs 31 and supported by coaxial reduced diameter cylindrical shaft sections or trunnions 22 seated in the arcuate journal surface 35.

Each roller type cam follower 20 is retained in its respective recess 34 by a roller retainer 40. As best shown in FIGS. 5-7 the roller retainer 40 is preferably formed from a continuous length of steel spring wire. The stock wire is cut to a length of about twelve inches and formed to provide a "U" shaped manual grip 41 and two substantially parallel legs 42 and 44 and a tang 46, 48 at the end of each respective leg 42, 44. The roller retainer legs 42,44 are each respectively bent in a "U" shape or hairpin type bend and arcuately formed at 50 and 52 to extend circumferentially around a portion of a cam follower roller trunnion 22 and to return partly around that same circumference portion with each tang 46, 48 seated in an aperture 36.

With reference to FIGS. 5-7, the intermediate portions 50,52 of the legs 42,44 are tangentially curved at x to project in one direction away from a reference plane m defined by the manual grip 41, rather sharply bent in the form of a hairpin bend to return in the direction of the reference plane m and tangentially curved at y to again project away from the same side of the reference plane m. The intermediate portions 50,52 of the legs 42,44 are preferably accurately formed between x and y to fit snugly and partly around and to resiliently embrace the trunnions 22 of a roller cam follower 20.

The roller retainer 40 is formed as described above so the manual grip 41 and the tangs 46,48 formed at the ends of the legs 42 and 46 are both disposed in the brake assembly on the same side of a reference plane n, see FIG. 2, parallel to the legs 42,44 and passing through the axis of the roller type cam follower 20. FIGS. 2 and 6 also show the manual grip 41 located on one side of a plane passing through the legs 42, 44 and the arcuately formed intermediate portions 50, 52 of the roller retainer 40 on the other side of that plane. This is accomplished by forming the intermediate portions 50,52 of each leg 42,44 to extend circumferentially in one direction, i.e. clockwise as shown in FIGS. 2 and 6, partly around the trunnion 22 of a cam follower and to return with the legs 42,44 extending tangentially away from the trunnion in the other circumferential direction.

The roller retainer 40 with the tangs 46,48 secured in the apertures 36 secures the trunnions 22 against the journal surfaces 35. The manual grip 41 is formed long and wide enough so as not to interfere with rotary movement of the cam 19 and is used to withdraw the roller retainer 40 when the brake assembly 10 is dismantled for servicing.

When the brake assembly 10 is to be dismantled the drum 25 is withdrawn and one of the brake shoes (preferably the lower shoe) 14 is manually rotated about its anchor pin 15 to expand the return spring 28. The manual grip 41 of the retainer 40 is then rotated radially outwardly about the apertures 36 to free the roller type cam follower without traversing the reference plane n. The cam follower is then withdrawn from that brake shoe. The other brake shoe 14 is then manually rotated about its anchor pin. The manual grip of the roller retainer associated with that brake shoe is rotated to free the cam follower which is then removed. The brake shoe return spring 28 is free of tension with the roller type cam followers removed and the spring 28 may be manually withdrawn. One brake shoe, preferably the lower shoe, is then rotated approximately 180° to relieve the tension on and thereby permit removal of the anchor end retaining springs 17. The brake shoes can then be manually withdrawn from the anchor pins and new or relined brake shoes substituted therefor. Except for removal of the brake drum the brake assembly can be dismantled manually without the use of any tools and without substantial risk of injury to the mechanic.

FIG. 4 illustrates a prior art roller retainer 60 used to secure a cam follower 20 in a recess formed at the end of a brake shoe web 31. The prior art retainer 60 is comprised of a "U" shaped manual grip 61 and a pair of legs with a tang formed at each end of each leg. One leg 62 and its tang 66 are depicted in FIG. 4. The other leg and tang are similar but disposed on the opposite side of the cam follower 20. The legs are formed to curve partly around the trunnions 22 of the cam follower with the manual grip 61 disposed radially interiorly of the cam follower 20 and the tangs disposed radially outwardly of the cam follower 20. This poses a serious problem while attempting to dismantle the brake assembly since the manual grip 61 has to be rotated about the apertures 36 to free the cam follower 20. This requires the brake shoe 14 to be moved a substantial distance away from the cam 19 to permit the manual grip 61 to clear the cam 19 and such movement creates a large tensile force on the return spring 28. The force is of such a magnitude as to present a substantial risk of injury to the fingers of a mechanic attempting to rotate the manual grip 61 between the cam follower 20 and the cam 19.

The roller retainer 40 as previously described and claimed hereafter does not present such a risk since the manual grip 41 and the tangs 46, 48 are disposed on the same side of the reference plane n and the arcuately curved intermediate portions 50,52 can be easily withdrawn with far less tensile stress on the return spring 28 and without having to manually move the retainer between the cam follower and the cam. The roller retainer of the present invention thus provides for ease of assembly and disassembly while avoiding the risk of personal injury attendant the use of the FIG. 4 type of prior art roller retainer.

The invention may also be embodied in other specific forms without departing from the spirit or essential characteristics thereof. The roller retainer may be formed from a synthetic material, stamped from a thin steel plate or fabricated as a combination of separate elements. The foregoing description is therefore to be considered as illustrative and not restrictive, the scope of the invention being defined by the appended claims, and all changes which come within the meaning and range of equivalency of the claims are therefore intended to be embraced thereby.

What is claimed and desired to be secured by letters patent is:

1. In a rotary cam actuated vehicle brake assembly including a pair of brake shoes with each brake shoe having a pair of spaced parallel webs, a rotary cam between adjacent ends of said brake shoes, and a roller type cam follower between said cam and said adjacent end of at least one of said brake shoes said cam follower having a pair of trunnions seated in open recesses provided at the end of said one brake shoe webs, the improvement comprising:

a roller retainer member secured to said one brake shoe and having a manual grip and two substantially parallel legs, said manual grip and said legs located on one side of a reference plane parallel to said legs and passing through the axis of said cam follower and a portion of said member intermediate at least one of said legs and said manual grip on the other side of said reference plane formed to extend only partly around the circumference of a roller trunnion surface.

2. The roller retainer member defined by claim 1 wherein said portion of said member intermediate said leg and said manual grip is formed to resiliently embrace said part of said roller trunnion surface.

3. The roller retainer member defined by claim 2 wherein said portion of said member is formed from a resilient material.

4. The roller retainer member defined by claim 2 wherein said portion of said member is formed from spring wire.

5. The roller retainer defined by claim 1 wherein said member is formed from a continuous length of spring wire and a portion of said member intermediate each leg and said manual grip on said other side of said reference plane is formed to extend only partly around and resiliently embrace the circumference of a roller trunnion surface.

6. In combination, a brake shoe having a dual web structure, said webs being formed with similar and laterally aligned open end recesses and an aperature adjacent each of said recesses, a cam follower having a roller intermediate the webs and trunnions supported in said recesses and a roller retainer comprised of a manual grip and a pair of spring legs extending therefrom, each leg having an end formed as a tang seated in one of said apertures and a portion of said retainer intermediate said manual grip and each leg formed to extend partially around one of said roller trunnions and to return around that same portion of said roller trunnion whereby said manual grip and said legs are disposed on the same side of a reference plane parallel to said legs and passing through the axis of said roller and said manual grip can be rotated about said apertures to free said cam follower without traversing said reference plane.

* * * * *